June 18, 1935. M. H. RIX 2,005,205
MEANS FOR CONNECTING TUBULAR MEMBERS
Filed April 29, 1933
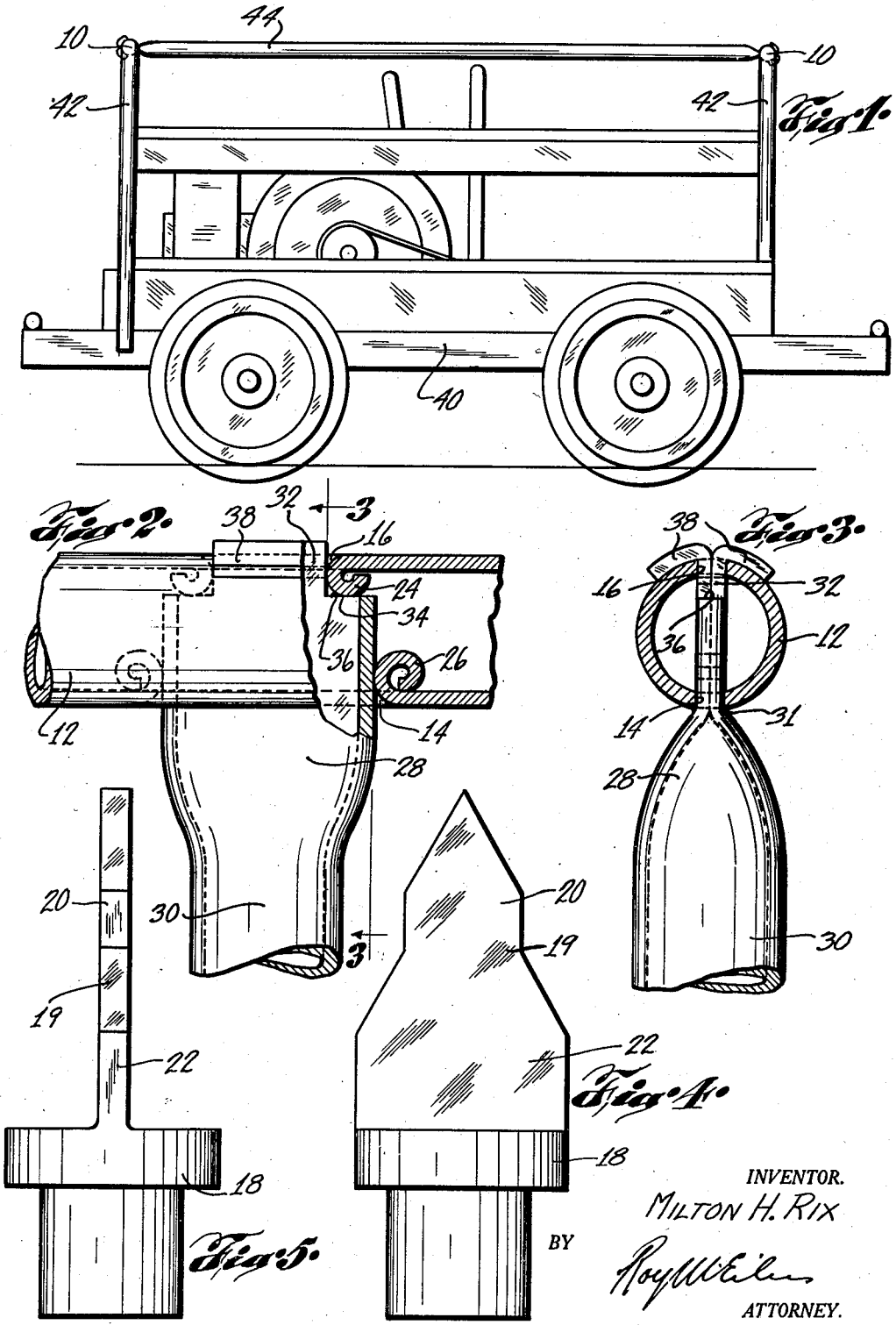
INVENTOR.
MILTON H. RIX
BY
ATTORNEY.

Patented June 18, 1935

2,005,205

UNITED STATES PATENT OFFICE 2,005,205

MEANS FOR CONNECTING TUBULAR MEMBERS

Milton H. Rix, Three Rivers, Mich., assignor to Fairbanks, Morse & Company, Chicago, Ill., a corporation of Illinois Application April 29, 1933, Serial No. 668,542

4 Claims. (Cl. 287—54)

An object of the present invention is attained in an improved method of joining pipes, or like tubular elements, the method being adapted to obviate the use of the usual pipe fittings, such as elbows and T elements, as well as connecting expedients of the order of welding or bolting.

Another object is attained in an improved method of joining one pipe to another in such a manner as to form a rigid and secure connection which is particularly adapted to withstand continued vibration and hard usage of the joined members.

A further object is attained in a method of connecting one metal tube to another, in angular relation which consists in flattening an end portion of one tube, in forming a slot transversely through a portion of a second tube, in directing the flattened tube end through the slot so that it protrudes from the opposite side of the slotted tube, and in spreading terminal wall portions of the protruding end, so as to lock the tube elements in the desired relation.

Another object is realized in a joint structure, through which metal tubular elements may be connected or assembled in angular relation; the joint being characterized as a cold joint, in distinction from soldering, brazing or welded connections, and being susceptible of formation entirely of the metal constituting the tubes themselves, in distinction from the separate fittings sometimes utilized, such as pipe fittings or the like.

A still further object of the present invention is attained in the provision of an improved punching tool which is particularly adapted to the forming of the tube or pipe slots hereinabove noted.

Further objects and advantages will appear from the following description, and from the appended drawing.

As an example of the application of the present invention, the method of joining tubular members is illustrated, by way of example, in connection with a railway motor car handrail structure. Joints formed in accordance with the method presently to be described and applied in the forming of such handrail structures, have been found in practice to be particularly suited for this service, the joints so formed being well adapted to withstand prolonged vibration, and the rough usage to which such handrails or bars are notoriously subjected.

In the drawing, Fig. 1 illustrates an application of pipe joints formed according to the present invention, to the hand rail structure of a railway motor car; Fig. 2 is a side elevation, partly in section, of a pipe joint; Fig. 3 is an end elevation of the joint, partly in section, as viewed along line 3—3 in Fig. 2; Fig. 4 is a side elevation of an improved punching tool employed in forming the joint, and Fig. 5 is an end elevation of the tool.

Referring, now, to the drawing by numerals of reference, 10 denotes, generally, a pipe joint structure formed in accordance with the present method. A tubular member or pipe section 12 is provided with a rectangular slot 14 through a portion of the pipe wall, and a second slot 16 through a portion of the pipe wall disposed diametrally opposite the first slot. Both slots will usually be of a trend longitudinally of the slotted tube. The slot 16 preferably conforms to the slot 14 in width, but is somewhat shorter in length, for a purpose which will presently appear.

The slots 14 and 16 are preferably formed by punching predetermined wall portions of the pipe with a suitably shaped punching tool, a tool found suitable for this purpose being illustrated in Figs. 4 and 5. The tool or punch is provided with a base portion 18 adapted to seat in a socket arranged in a suitable punch frame (not shown). The punch blade 19 has its outer end 20 so shaped as to form the slot 16, and the inner end 22, of a gauge and width to form the longer slot 14. The wall portions to be slotted are both, by preference, punched inwardly of the tube wall, the punched portions being divided and rolled up within the tube pipe, on each end of the slots thus formed, the cut, inturned ends being illustrated at 24 and 26.

One end 28 of a second pipe section 30 which is to be secured to the pipe section 12, is compressed and flattened by any suitable means, such as a press. As a result of compressing the end 28, the side walls of pipe 30 converge to a shouldered relation, substantially as shown at 31 in Fig. 3. Side portions of the flattened or tongued section 28, adjacent the outer end 32, are cut away or notched, as at 34, to form shoulders 36 which engage the inturned wall portions 24 of pipe 12 when the end 28 of pipe 30 is inserted in the slot 14. It will be noted that the slot 14 is so formed and dimensioned as closely to confine the pipe end 28 therein, to eliminate any relative motion or side play between the pipe members. The slot 16 similarly confines the end portion 32 extending therethrough. In the formation of the shoulder portions 36, the outer end 32 becomes divided, or split into two tongued sections or furcations 38 which, in assembly, are spread or bent over, as illustrated in Fig. 3. The spreading of the sections 38 draws the shoulders 36 firmly against the inturned metal portions 24, and at the same time tends to wedge the flattened end adjacent the convergent wall portion 31, in the slot 14, as a direct result of the wedge shape of the pipe portion 31.

The method of assembly is extremely simple, and may consist merely in inserting the prepared end 28 of pipe 30 through the slots 14 and 16 until the shoulder portions 36 engage the inturned scroll portions 24 of pipe 12. With the pipe members suitably held in such engagement, the ends 38 may then be caused to diverge, and brought by impact or pressure, into snugly overlying engagement with the outer wall portions of tube 12, adjacent slot 16, thereby forming a firm and secure joint or connection.

It may be noted here that in forming a joint as herein described, it may in certain cases be more desirable for greater economy, to punch the slots 14 and 16 in a single operation, from one side of the pipe member 12. In such case, the rolled metal portions 24 would be turned outwardly of the adjacent pipe wall, and removed after the slot 16 is formed. Thereafter, in joining the end 28 of pipe 30 to the prepared portion of pipe 12, the shoulder portions 36 would engage the inner surface of marginal wall portions of the pipe 12 defining the slot 16, instead of abutting the inturned metal portions 24, as shown in Fig. 2 of the drawing.

Fig. 1 illustrates the joint as applied to the hand bar structure of a railway motor car 40. In the present example, the pipe section 12 may be a portion of a vertical hand rail support 42, disposed near one end of the car 40, and the pipe section 30 may consist of a horizontal element of a hand bar 44. It is of course within the intent of the present invention to employ a joint of a similar, possibly slightly modified type, for connecting tubular guard rail elements for a variety of uses, and in fact in any situation where metal tubular elements are to be brought into structural union.

The presently described method of joining tubular members, and the preparation of the members for connection, provides a considerable improvement over practices heretofore conventionally employed, particularly as regards economy of material and assembly operations, the tubes or pipes themselves supplying the metal constituting the joint. The resulting joint is well adapted to withstand considerable vibration and rough usage, and provides a safe and reliable connection. Furthermore, the presently improved method of preparing and connecting tubular members is in keeping with the requirements of rapid mass production, and requires practically no special equipment, thereby presenting a number of distinct advantages to manufacturers.

It is to be understood, of course, that this invention is not to be limited to the present preferred embodiment thereof, as certain alterations and modifications may be made without departing from the spirit and full intended scope of the invention, as defined by the appended claims.

I claim:

1. In a joint or connection for tubular members, a passage formed by aligned apertures through wall portions of one member, a compressed end portion on the other member, adapted to extend through said apertures, terminals on the outer end of said compressed portion, having faces seated on opposite sides of one of said apertures, for clamping the members in assembly, and means on the compressed end of the second member arranged to engage an inner wall portion of said first member.

2. In a connection for joining tubular members, a passage formed by apertures through wall portions of one of the members, said apertures being disposed in alignment in opposite tube walls, a compressed end portion on the other tubular member, said portion being furcated and extending through said apertures, and a shoulder on said compressed end portion arranged to engage an inner wall portion of said first member, said furcated end being spread, externally of the first tubular member, whereby to secure the members in assembly.

3. A connection or joint for angularly connected tubular members, including a passage formed by aligned slotted apertures in the opposite walls of one of the tubular members, one of the apertures being of lesser length, an abutment formed internally of the apertured member, adjacent one of the slotted apertures, a terminal tongue formed on the other tubular member and consisting of a flattened end, a lateral margin of which is cut away to form a shoulder, furcations at the extreme end of the tongue, the tongue extending through said passage so that the shoulder engages said abutment, the furcations being spread into holding engagement, beyond the shorter slotted aperture, with the apertured member.

4. A connection or joint for angularly connected tubular members, including a passage formed by aligned slotted apertures in the opposite walls of one of the tubular members, one of the apertures being of lesser length, an abutment formed internally of the apertured member adjacent one of the slotted apertures, guide elements struck inwardly of the other slotted aperture, a terminal tongue formed on the other tubular member and consisting of a flattened end, a lateral margin of which is cut away to form a shoulder, furcations at the extreme end of the tongue, the tongue extending through said passage so that the shoulder engages said abutment, and the guide elements laterally engage the tongue, the furcations being spread into holding engagement, beyond the shorter slotted aperture, with the apertured member.

MILTON H. RIX.